(12) United States Patent
Miyaji et al.

(10) Patent No.: US 10,309,286 B2
(45) Date of Patent: Jun. 4, 2019

(54) HYBRID VEHICLE

(71) Applicant: TOYOTA JIDOSHA KABUSHIKI KAISHA, Toyota-shi, Aichi-ken (JP)

(72) Inventors: Kazuya Miyaji, Okazaki (JP); Takashi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/831,715

(22) Filed: Dec. 5, 2017

(65) Prior Publication Data

US 2018/0156098 A1    Jun. 7, 2018

(30) Foreign Application Priority Data

Dec. 7, 2016  (JP) .................................. 2016-237547

(51) Int. Cl.
*F01N 3/023* (2006.01)
*F01N 9/00* (2006.01)
*F01N 11/00* (2006.01)

(52) U.S. Cl.
CPC ............. *F01N 9/002* (2013.01); *F01N 3/023* (2013.01); *F01N 11/00* (2013.01); *F01N 2430/06* (2013.01); *F01N 2590/11* (2013.01); *F01N 2900/08* (2013.01); *Y02T 10/47* (2013.01)

(58) Field of Classification Search
CPC ...... F01N 3/023; F01N 9/002; F01N 2430/06; F01N 2590/11; F02D 41/029; F02D 2041/026
See application file for complete search history.

(56) References Cited

U.S. PATENT DOCUMENTS

2003/0066286 A1* 4/2003 Murata .................. B60K 6/485
60/284
2017/0022863 A1* 1/2017 Naidu ................... F01N 3/0885

FOREIGN PATENT DOCUMENTS

| JP | 2003-120263 A | 4/2003 |
| JP | 2009-156100   | 7/2009 |
| JP | 2012-219732   | 11/2012 |
| JP | 2015-155276 A | 8/2015 |

* cited by examiner

*Primary Examiner* — Jonathan R Matthias
(74) *Attorney, Agent, or Firm* — Finnegan, Henderson, Farabow, Garrett & Dunner, LLP

(57) ABSTRACT

In a hybrid vehicle that includes an engine having a particulate matter removing filter configured to remove particulate matters in an exhaust system, when an increase in temperature of the particulate matter removing filter is requested in order to regenerate the particulate matter removing filter, dither control is executed to execute control such that an air-fuel ratio of the engine is repeated between a rich state and a lean state. Then, when the dither control is executed, control is executed such that the engine is operated at an operation point where the increase in temperature of the particulate matter removing filter is promoted among operation points where power output from the engine is retainable.

2 Claims, 2 Drawing Sheets

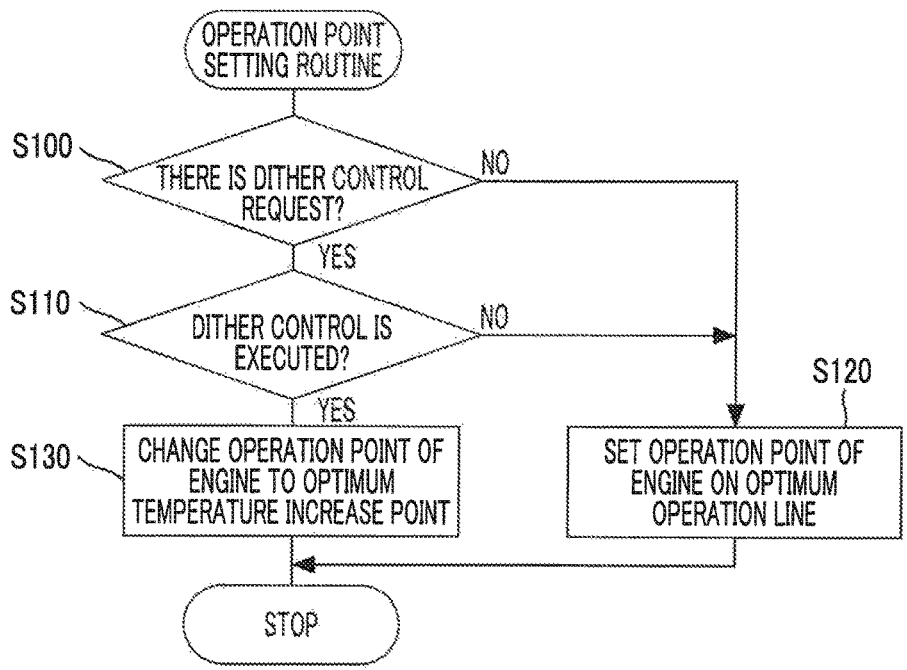
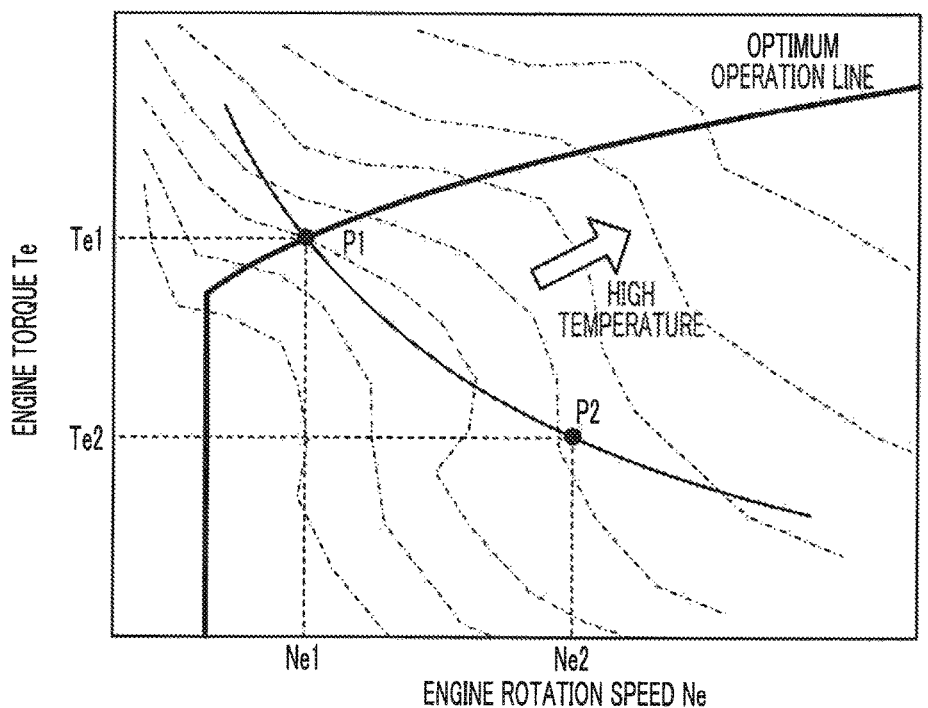

HYBRID VEHICLE

CROSS-REFERENCE TO RELATED APPLICATIONS

The disclosure of Japanese Patent Application No. 2016-237547 filed on Dec. 7, 2016 including the specification, drawings and abstract is incorporated herein by reference in its entirety.

BACKGROUND

1. Technical Field

The present disclosure relates to a hybrid vehicle, and in particular, to a hybrid vehicle that includes an engine having a particulate matter removing filter configured to remove particulate matters in an exhaust system.

2. Description of Related Art

In the related art, as this kind of technique, a technique in which, when regeneration of a particulate matter removing filter is requested, an air-fuel mixture having an air-fuel ratio on a richer side than a stoichiometric air-fuel ratio is supplied to a first cylinder, and an air-fuel mixture having an air-fuel ratio on a leaner side than the stoichiometric air-fuel ratio is supplied to second to fourth cylinders has been suggested (for example, see Japanese Unexamined Patent Application Publication No. 2009-156100 (JP 2009-156100 A). In the technique, with such control, oxygen is supplied to the particulate matter removing filter to combust particulate matters, and gas having the stoichiometric air-fuel ratio is made to flow into a downstream catalyst, whereby the particulate matter removing filter is regenerated without causing an increase in the amount of discharge of nitrogen oxide.

In a hybrid vehicle in which an engine having a particulate matter removing filter configured to remove particulate matters in an exhaust system is mounted, in order to rapidly increase the temperature of the particulate matter removing filter to be equal to or higher than a regeneration possible temperature, a technique in which dither control that is control for repeating the air-fuel ratio of the engine between a rich state and a lean state is executed has been suggested (for example, see Japanese Unexamined Patent Application Publication No. 2012-219732 (JP 2012-219732 A)).

SUMMARY

Like the above-described hybrid vehicle, in order to rapidly increase the temperature of the particulate matter removing filter to be equal to or higher than the regeneration possible temperature, even when the dither control that is the control for repeating the air-fuel ratio of the engine between the rich state and the lean state is executed, time is taken until the temperature of the particulate matter removing filter is increased to the regeneration possible temperature, and more time may be taken than needed for regenerating the particulate matter removing filter. For this reason, it is desirable to rapidly perform an increase in temperature of the particulate matter removing filter.

In consideration of the above-described problem, the disclosure provides a hybrid vehicle that rapidly performs an increase in temperature of a particulate matter removing filter.

An aspect of the disclosure relates to a hybrid vehicle including an engine, a motor, an electric power storage device, and an electronic control unit. The engine has a particulate matter removing filter configured to remove particulate matters in an exhaust system of the engine. The motor is configured to output power for traveling. The electric power storage device is configured to exchange electric power with the motor. The electronic control unit is configured as follows. That is, the electronic control unit is configured to (i) control the engine and the motor, (ii) when an increase in temperature of the particulate matter removing filter is requested in order to regenerate the particulate matter removing filter, execute dither control to execute control such that an air-fuel ratio of the engine is repeated between a rich state and a lean state, and (iii) when the dither control is executed, execute control such that the engine is operated at an operation point where the increase in temperature of the particulate matter removing filter is promoted among operation points where power output from the engine is retainable.

As described above, in the hybrid vehicle according to the aspect of the disclosure, when the increase in temperature of the particulate matter removing filter is requested in order to regenerate the particulate matter removing filter, the dither control is executed to execute control such that the air-fuel ratio of the engine is repeated between the rich state and the lean state. Then, when the dither control is executed, control is executed such that the engine is operated at the operation point where the increase in temperature of the particulate matter removing filter is promoted among the operation points where the power output from the engine is retainable. With this, it is possible to rapidly perform an increase in temperature of the particulate matter removing filter without changing the power from the engine.

In the hybrid vehicle according to the aspect of the disclosure, the electronic control unit may be configured as follows. That is, the electronic control unit may be configured to (i) when the dither control is not executed, execute control such that the engine is operated at an operation point on a prescribed operation line for optimum fuel efficiency, and (ii) when the dither control is executed, execute control such that the engine is operated at an operation point where the increase in temperature of the particulate matter removing filter is optimum among the operation points where the power output from the engine is retainable. With the hybrid vehicle, it is possible to more rapidly increase the temperature of the particulate matter removing filter.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart showing an example of an operation point setting routine of the hybrid vehicle; and FIG. 3 is an explanatory view showing an example of a mode in which a target operation point of an engine is set using an optimum operation line and an operation line for dither control in the hybrid vehicle.

DETAILED DESCRIPTION OF EMBODIMENTS

Figure 1:
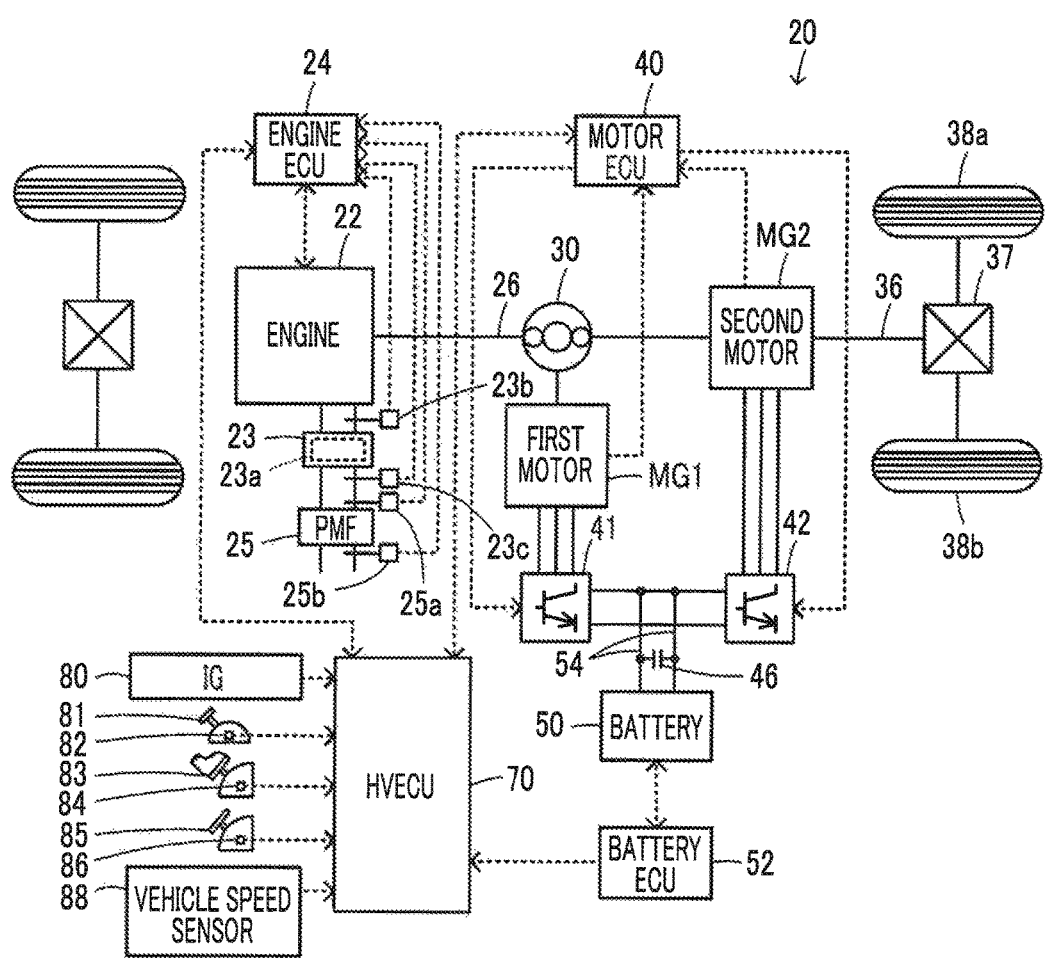
FIG. 1 is a configuration diagram showing the outline of the configuration of a hybrid vehicle as an embodiment of the disclosure.

Next, a mode for carrying out the disclosure will be described in connection with an embodiment.

FIG. 1 is a configuration diagram showing the outline of the configuration of a hybrid vehicle 20 as an embodiment of the disclosure. As shown in the drawing, the hybrid vehicle 20 of the embodiment includes an engine 22, a planetary gear set 30, first motor MG1, a second motor MG2, a first inverter 41, a second inverter 42, a battery 50 that is an electric power storage device, an electronic control unit for hybrid (hereinafter, referred to as an HVECU) 70 that is one of an electronic control unit.

The engine 22 is constituted as an internal combustion engine that outputs power with gasoline, diesel, or the like as fuel. The operation of the engine 22 is controlled by an electronic control unit for an engine (hereinafter, referred to as an engine ECU) 24. An exhaust gas control apparatus 23 and a particulate matter removing filter (hereinafter, referred to as a PMF) 25 are attached to the exhaust system of the engine 22. The exhaust gas control apparatus 23 is filled with a catalyst 23a that removes unburned fuel, nitrogen oxide, or the like in exhaust gas. The PMF 25 is formed as a porous filter of ceramics, stainless steel, or the like, and traps particulate matters (PM), such as soot.

Though not shown, the engine ECU 24 is constituted as a microprocessor centering on a CPU, and includes, in addition to the CPU, a ROM that stores a processing program, a RAM that temporarily stores data, an input/output port, and a communication port. Signals from various sensors needed for controlling the operation of the engine 22 are input to the engine ECU 24 through the input port. As the signals from various sensors, for example, a crank position from a crank position sensor (not shown) that detects a rotation position of a crankshaft 26, a coolant temperature Tw from a coolant temperature sensor (not shown) that detects a temperature of a coolant of the engine 22, and the like can be exemplified. A throttle valve opening degree TH from a throttle valve position sensor (not shown) that detects a position of a throttle valve, an intake air amount Qa from an air flowmeter (not shown) attached to an intake pipe, an intake air temperature Ta from a temperature sensor (not shown) attached to the intake pipe, and the like can also be exemplified. An air-fuel ratio A/F from an air-fuel ratio sensor 23b attached upstream of the exhaust gas control apparatus 23 of the exhaust system, an oxygen signal O2 from an oxygen sensor 23c attached downstream of the exhaust gas control apparatus 23, and pressure P1, P2 from a first pressure sensor 25a and a second pressure sensor 25b attached upstream and downstream of the PMF 25 can also be exemplified. Various control signals for controlling the operation of the engine 22 are output from the engine ECU 24 through the output port. As various control signals, for example, a drive signal to a fuel injection valve, a drive signal to a throttle motor that regulates a position of the throttle valve, and a control signal to an ignition coil integrated with an igniter can be exemplified. The engine ECU 24 is connected to the HVECU 70 through the communication port. The engine ECU 24 controls the operation of the engine 22 according to a control signal from the HVECU 70. The engine ECU 24 outputs data relating to an operation state of the engine 22 to the HVECU 70 as needed. The engine ECU 24 calculates a rotation speed of the crankshaft 26, that is, a rotation speed Ne of the engine 22 based on a crank angle $\theta cr$. The engine ECU 24 also calculates volumetric efficiency (a ratio of volume of air actually sucked in one cycle to stroke volume of the engine 22 per cycle) KL based on the intake air amount Qa from the air flowmeter and the rotation speed Ne of the engine 22. The engine ECU 24 calculates a PM deposition amount Qpm as an estimated deposition amount of particulate matters trapped on the PMF 25 based on a difference pressure $\Delta P$ ($\Delta P=P1-P2$) of the pressure P1, P2 from the first pressure sensor 25a and the second pressure sensor 25b, or calculates a filter temperature Tf as an estimated temperature of the PMF 25 based on the operation state of the engine 22.

The planetary gear set 30 is constituted as a single-pinion type planetary gear mechanism, and a rotor of the first motor MG1 is connected to a sun gear of the planetary gear set 30. A drive shaft 36 coupled to drive wheels 38a, 38b through a differential gear set 37 is connected to a ring gear of the planetary gear set 30. The crankshaft 26 of the engine 22 is connected to a carrier of the planetary gear set 30.

The first motor MG1 is constituted as a known synchronous motor generator including a rotor embedded with a permanent magnet and a stator wound with three-phase coils, and as described above, the rotor is connected to the sun gear of the planetary gear set 30. The second motor MG2 is constituted as a synchronous motor generator like the first motor MG1, and the rotor is connected to the drive shaft 36. The first motor MG1 and the second motor MG2 are driven by a motor ECU 40 controlling the first inverter 41 and the second inverter 42. The first inverter 41 and the second inverter 42 are connected to an electric power line 54 to which the battery 50 is connected. Each of the first inverter 41 and the second inverter 42 is constituted as a known inverter having six transistors and six diodes. Since the first inverter 41 and the second inverter 42 share the electric power line 54, it is possible to supply electric power generated by the first motor MG1 or the second motor MG2 to the second motor MG2 or the first motor MG1.

Though not shown, the motor ECU 40 is constituted as a microprocessor centering on a CPU, and includes, in addition to the CPU, a ROM that stores a processing program, a RAM that temporarily stores data, an input/output port, and a communication port. Signals from various sensors needed for controlling the drive of the first motor MG1 and the second motor MG2 are input to the motor ECU 40 through the input port. As the signals from various sensors, for example, rotation positions $\theta m1$, $\theta m2$ from rotation position detection sensors (not shown) that detect rotation positions of the rotors of the first motor MG1 and the second motor MG2, phase currents from current sensors that detect currents flowing in the phases of the first motor MG1 and the second motor MG2, a voltage VL of a capacitor 46 (electric power line 54) from a voltage sensor (not shown) attached between terminals of the capacitor 46, and the like can be exemplified. A switching control signal to the transistors of the first inverter 41 and the second inverter 42 for controlling the drive of the first motor MG1 and the second motor MG2, and the like are output from the motor ECU 40 through the output port. The motor ECU 40 is connected to the HVECU 70 through the communication port. The motor ECU 40 controls the drive of the first motor MG1 and the second motor MG2 according to a control signal from the HVECU 70. The motor ECU 40 outputs data relating to drive states of the first motor MG1 and the second motor MG2 to the HVECU 70 as needed. The motor ECU 40 calculates a rotation speed Nm1 of the first motor MG1 and a rotation speed Nm2 of the second motor MG2 based on the rotation positions $\theta m1$, $\theta m2$ of the rotors of the first motor MG1 and the second motor MG2.

The battery 50 is constituted as, for example, a lithium-ion secondary battery or a nickel-hydrogen secondary battery, and exchanges electric power with the first motor MG1 and the second motor MG2 through the first inverter 41 and the second inverter 42. The battery 50 is managed by an electronic control unit for a battery (hereinafter, referred to as a battery ECU) 52.

Though not shown, the battery ECU 52 is constituted as a microprocessor centering on a CPU, and includes, in addition to the CPU, a ROM that stores a processing program, a RAM that temporarily stores data, an input/output port, and a communication port. Signals needed for managing the battery 50 are input to the battery ECU 52 through the input port, and data relating to a state of the battery 50 is transmitted to the HVECU 70 through communication as needed. As the signals that are input through the input port, for example, an inter-terminal voltage Vb from a voltage sensor (not shown) provided between terminals of the battery 50, a charging and discharging current Ib from a current sensor (not shown) attached to the electric power line 54 connected to an output terminal of the battery 50, a battery temperature Tb from a temperature sensor (not shown) attached to the battery 50, and the like can be exemplified. The battery ECU 52 calculates a state of charge (hereinafter, referred to as SOC), an input limit Win, and an output limit Wout in order to manage the battery 50. The SOC is a ratio of capacity of electric power dischargeable from the battery 50 to total capacity, and is calculated based on an integrated value of the charging and discharging current Ib detected by the current sensor. The input limit Win and the output limit Wout are maximum allowable electric power in charging and discharging the battery 50, and are calculated based on the calculated SOC and the battery temperature Tb.

Though not shown, the HVECU 70 is constituted as a microprocessor centering on a CPU, and includes, in addition to the CPU, a ROM that stores a processing program, a RAM that temporarily stores data, an input/output port, and a communication port. Signals from various sensors are input to the HVECU 70 through the input port. As the signals from various sensors, for example, an ignition signal from an ignition switch 80 and a shift position SP from a shift position sensor 82 that detects an operation position of a shift lever 81 can be exemplified. An accelerator operation amount (accelerator depression amount) Acc from an accelerator pedal position sensor 84 that detects a depression amount of an accelerator pedal 83, a brake pedal position BP from a brake pedal position sensor 86 that detects a depression amount of a brake pedal 85, a vehicle speed V from a vehicle speed sensor 88, and the like can also be exemplified. As described above, the HVECU 70 is connected to the engine ECU 24, the motor ECU 40, and the battery ECU 52 through the communication port. The HVECU 70 exchanges various control signals or data with the engine ECU 24, the motor ECU 40, and the battery ECU 52.

The hybrid vehicle 20 of the embodiment configured as above travels in a hybrid traveling mode (HV traveling mode) in which traveling is enabled accompanied with the operation of the engine 22 or an electrically powered traveling mode (EV traveling mode) in which traveling is enabled while the operation of the engine 22 is stopped.

At the time of traveling in the HV traveling mode, the HVECU 70 first sets requested torque Tr* requested for traveling (to be output to the drive shaft 36) based on the accelerator operation amount Acc from the accelerator pedal position sensor 84 and the vehicle speed V from the vehicle speed sensor 88. Subsequently, power for traveling Pdrv* requested for traveling is calculated by multiplying the set requested torque Tr* by a rotation speed Nr of the drive shaft 36. As the rotation speed Nr of the drive shaft 36, a rotation speed that is obtained by multiplying the rotation speed Nm2 of the second motor MG2 or the vehicle speed V by a conversion coefficient can be used. Then, requested power Pe* requested for the vehicle is set by subtracting requested charging and discharging power Pb* (a positive value when electric power is discharged from the battery 50) of the battery 50 from the calculated power for traveling Pdrv*. The requested charging and discharging power Pb* is set based on the difference ΔSOC between the SOC and a target SOC* of the battery 50 such that an absolute value of the difference ΔSOC becomes small. Next, a target operation point (target rotation speed Ne*, target torque Te*) of the engine 22, a torque command Tm1* of the first motor MG1, and a torque command Tm2* of the second motor MG2 are set such that the requested power Pe* is output from the engine 22 and the requested torque Tr* is output to the drive shaft 36. A target operation point (target rotation speed Ne*, target torque Te*) of the engine 22 is set by determining an optimum operation line for optimum fuel efficiency in advance the among operation points (rotation speed, torque) of the engine 22 in consideration of noise, vibration, or the like and obtaining an operation point (rotation speed, torque) on the optimum operation line corresponding to the requested power Pe*. The target operation point (target rotation speed Ne*, target torque Te*) of the engine 22 is transmitted to the engine ECU 24. The torque command Tm1* of the first motor MG1 and the torque command Tm2* of the second motor MG2 are transmitted to the motor ECU 40. The engine ECU 24 executes intake air amount control, fuel injection control, ignition control, and the like of the engine 22 such that the engine 22 is operated based on the target operation point. The motor ECU 40 executes switching control of the transistors of the first inverter 41 and the second inverter 42 such that the first motor MG1 is driven with the torque command Tm1* and the second motor MG2 is driven with the torque command Tm2*.

At the time of traveling in the EV traveling mode, the HVECU 70 first sets the requested torque Tr* based on the accelerator operation amount Acc from the accelerator pedal position sensor 84 and the vehicle speed V from the vehicle speed sensor 88, and calculates the power for traveling Pdrv* by multiplying the requested torque Tr* by the rotation speed Nr of the drive shaft 36. Subsequently, a value of 0 is set as the torque command Tm1* of the first motor MG1, and the torque command Tm2* of the second motor MG2 is set such that the requested torque Tr (power for traveling Pdrv*) is output to the drive shaft 36. The torque command Tm1* of the first motor MG1 and the torque command Tm2* of the second motor MG2 are transmitted to the motor ECU 40. As described above, the motor ECU 40 controls the first inverter 41 and the second inverter 42.

Next, an operation of the hybrid vehicle 20 of the embodiment configured as above, in particular, an operation in a case of promoting regeneration of the PMF 25 on which the particulate matters (PM) are deposited will be described. The regeneration of the PMF 25 is performed when the PM deposition amount Qpm estimated based on the difference pressure ΔP (ΔP=P1−P2) of the pressure P1, P2 from the first pressure sensor 25a and the second pressure sensor 25b is equal to or greater than a predetermined deposition amount and when a regeneration request is transmitted from the engine ECU 24. The regeneration of the PMF 25 is performed by increasing the temperature of the PMF 25 to be equal to or higher than a regeneration possible temperature (for example, 600° C. or the like), and in the temperature state, operating the engine 22 with an air-fuel ratio in a lean state (a state in which the amount of fuel is smaller than that of a stoichiometric air-fuel ratio) or operating the engine 22 in a state in which fuel injection is stopped, supplying air (oxygen) to the PMF 25, and combusting the particulate matters deposited on the PMF 25. In a case where the temperature of the PMF 25 is increased to be equal to or higher than the regeneration possible temperature, in order that the increase in temperature is rapidly performed, the engine ECU 24 executes dither control in which the engine 22 is operated by performing fuel injection such that the air-fuel ratio of the engine 22 is repeated between a rich state (a state in which the amount of fuel is greater than that of the stoichiometric air-fuel ratio) and the lean state. Accordingly, the regeneration request from the engine ECU 24 becomes an execution request of the dither control.

In the hybrid vehicle 20 of the embodiment, as one operation in a case of promoting the regeneration of the PMF 25, an operation point setting routine illustrated in FIG. 2 is executed by the engine ECU 24. The routine is executed at every predetermined time (for example, every tens of msec or the like).

In a case where the operation point setting routine is executed, the engine ECU 24 first determines whether or not there is the execution request of the dither control (Step S100). As described above, the execution request of the dither control has the same meaning as the regeneration request of the PMF 25. When the engine ECU 24 determines that there is no execution request of the dither control, the engine ECU determines that normal control needs to be executed, and executes control such that the engine 22 is operated at the operation point on the optimum operation line (Step S120). Then, the routine ends. When the engine ECU 24 determines that there is the execution request of the dither control, the engine ECU 24 determines whether or not the dither control is executed (Step S110). When the engine ECU 24 determines that the dither control is not executed, the engine ECU 24 determines that the normal control needs to be executed since the increase in temperature of the PMF 25 is not performed yet, and executes control such that the engine 22 is operated at the operation point on the optimum operation line (Step S120). Then, the routine ends.

When the engine ECU 24 determines that the dither control is executed, the engine ECU 24 changes the operation point such that the engine 22 is operated at an optimum operation point for promoting the increase in temperature of the PMF 25 in a state in which power output from the engine 22 is retained (Step S130). Then, the routine ends. FIG. 3 is an explanatory view showing an example of a mode in which the operation point is changed from the operation point on the optimum operation line to the optimum operation point for promoting the increase in temperature of the PMF 25. In the drawing, a thick solid line indicates the optimum operation line. A curve of a downward convex solid line indicates a curve where the power from the engine 22 is constant. A one-dot-chain line indicates a contour line of a degree of promoting the increase in temperature of the PMF 25. The degree of promoting the increase in temperature of the PMF 25 is set such that, as indicated by a white arrow in the drawing, the degree of promoting becomes large toward an upper right direction. It should be noted that the relationship of FIG. 3 can be obtained by an experiment or the like. As shown in the drawing, in a case where the operation point of the engine 22 is changed from an operation point P1 (rotation speed Ne1, torque Te1) on the optimum operation line to an operation point P2 (rotation speed Ne2, torque Te2) with the same power, the degree of promoting the increase in temperature of the PMF 25 becomes large. Accordingly, in a case where the engine 22 is operated at the operation point P2, it is possible to promote the increase in temperature of the PMF 25 compared to when the engine 22 is operated at the operation point P1. In the embodiment, the power and the optimum operation point for promoting the increase in temperature of the PMF 25 are determined in advance within a range in which the engine 22 is operable and in consideration of noise, vibration, or the like and stored in the form of a map, and in a case where power is given, a corresponding operation point is derived from the map and set.

In the hybrid vehicle 20 of the embodiment described above, when there is the execution request of the dither control and the dither control is executed, control is executed such that the engine 22 is operated at the optimum operation point for promoting the increase in temperature of the PMF 25 among the operation points where the power output from the engine 22 is retainable. With this, it is possible to more rapidly increase the temperature of the PMF 25. As a result, it is possible to rapidly perform the regeneration of the PMF 25.

In the embodiment, when there is the execution request of the dither control and the dither control is executed, control is executed such that the engine 22 is operated at the optimum operation point for promoting the increase in temperature of the PMF 25 among the operation points where the power output from the engine 22 is retainable. However, control may be executed such that the engine 22 is operated at an operation point where the increase in temperature of the PMF 25 is promoted to a certain degree among the operation points where the power output from the engine 22 is retainable.

In the embodiment, the disclosure is applied to a hybrid vehicle of a type in which the engine 22, the first motor MG1, and the second motor MG2 are connected to the planetary gear set 30; however, the disclosure may be applied to various types of hybrid vehicles that include an engine having a particulate matter removing filter (PMF) configured to remove particulate matters in an exhaust system, a motor configured to output power for traveling, and an electric power storage device configured to exchange electric power with the motor. In the embodiment, the battery 50 corresponds to an electric power storage device; however, any device, such as a capacitor, may be applied as an electric power storage device as long as the device can store electric charge.

Although the mode for carrying out the disclosure has been described above in connection with the embodiment, the disclosure is not limited to the embodiment, and can be of course carried out in various forms without departing from the spirit and scope of the disclosure.

The disclosure is usable in a manufacturing industry of a hybrid vehicle, or the like.

What is claimed is:

1. A hybrid vehicle comprising:
    an engine including a particulate matter removing filter configured to remove particulate matters in an exhaust system of the engine;
    a motor configured to output power for traveling of the hybrid vehicle;
    an electric power storage device configured to exchange electric power with the motor; and
    an electronic control unit configured to:
    (i) control the engine and the motor,
    (ii) when an increase in temperature of the particulate matter removing filter is requested in order to regenerate the particulate matter removing filter, execute dither control to execute control such that an air-fuel ratio of the engine is repeated between a rich state and a lean state, and
    (iii) when the dither control is executed, execute control such that the engine is operated at an operation point with a lower engine output torque and higher engine rotation speed than when the dither control is not executed such that the increase in temperature of the particulate matter removing filter is promoted and the power output from the engine remains the same as when the dither control is not executed.

2. The hybrid vehicle according to claim 1, wherein the electronic control unit is configured to:
  (i) when the dither control is not executed, execute control such that the engine is operated at an operation point of an engine output torque and an engine rotation speed on a prescribed operation line for optimum fuel efficiency, and
  (ii) when the dither control is executed, execute control such that the engine is operated at an operation point of an engine output torque and an engine rotation speed where the increase in temperature of the particulate matter removing filter is optimum among the operation points where the power output from the engine remains the same as when the dither control is not executed.

* * * * *